(12) United States Patent
Ramesh et al.

(10) Patent No.: US 12,256,175 B2
(45) Date of Patent: Mar. 18, 2025

(54) GENERATING A USER AVATAR FOR VIDEO COMMUNICATIONS

(71) Applicant: Roku, Inc., San Jose, CA (US)

(72) Inventors: Sunil Ramesh, Cupertino, CA (US); Michael Cutter, Golden, CO (US); Karina Levitian, Austin, TX (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/065,026

(22) Filed: Dec. 13, 2022

(65) Prior Publication Data
US 2024/0195940 A1 Jun. 13, 2024

(51) Int. Cl.
| | |
|---|---|
| G06T 13/40 | (2011.01) |
| G06T 13/20 | (2011.01) |
| G06V 10/774 | (2022.01) |
| G06V 10/80 | (2022.01) |
| G06V 10/82 | (2022.01) |
| G06V 40/16 | (2022.01) |
| H04N 7/15 | (2006.01) |

(52) U.S. Cl.
CPC .......... *H04N 7/157* (2013.01); *G06T 13/205* (2013.01); *G06T 13/40* (2013.01); *G06V 10/774* (2022.01); *G06V 10/811* (2022.01); *G06V 10/82* (2022.01); *G06V 40/168* (2022.01); *G06V 40/172* (2022.01)

(58) Field of Classification Search
CPC ....... H04N 7/157; G06T 13/205; G06T 13/40; G06V 10/774; G06V 10/811; G06V 10/82; G06V 40/168; G06V 40/172
USPC ......................................................... 715/757
See application file for complete search history.

(56) References Cited

U.S. PATENT DOCUMENTS

| | | | | |
|---|---|---|---|---|
| 9,361,722 | B2* | 6/2016 | Latorre-Martinez | ... G06T 13/40 |
| 2014/0176662 | A1* | 6/2014 | Goodman | ............... H04W 4/21 |
| | | | | 348/14.07 |
| 2016/0134840 | A1* | 5/2016 | McCulloch | .......... G06V 40/165 |
| | | | | 348/14.03 |
| 2017/0039750 | A1* | 2/2017 | Tong | ........................ G06T 13/40 |
| 2017/0243387 | A1* | 8/2017 | Li | ........................... G06V 20/46 |
| 2019/0104448 | A1* | 4/2019 | Abuan | .................. H04L 63/065 |
| 2019/0361694 | A1* | 11/2019 | Gordon | ................. G06F 1/3231 |
| 2019/0370544 | A1* | 12/2019 | Wright, Jr. | ............. G06Q 10/20 |

(Continued)

OTHER PUBLICATIONS

Olszewski et al., High-Fidelity Facial and Speech Animation for VR HMDs, published Nov. 2016, pp. 1-14. (Year: 2016).*

(Continued)

*Primary Examiner* — Shahid K Khan
*Assistant Examiner* — Ahamed I Nazar
(74) *Attorney, Agent, or Firm* — McDonnell Boehnen Hulbert & Berghoff LLP

(57) ABSTRACT

In one aspect, an example method includes (i) receiving audio from a first client device engaged in a communication session with a second client device, the audio comprising one or more words spoken by a user of the first client device; (ii) using the audio and a facial feature model to estimate facial movement that corresponds to the one or more words spoken by the user; (iii) generating a synthetic video depicting an avatar of the user moving according to the estimated facial movement; and (iv) in response to generating the synthetic video, causing the second client device to present the synthetic video synchronized with the audio.

14 Claims, 4 Drawing Sheets

(56) References Cited

U.S. PATENT DOCUMENTS

2020/0279017 A1* 9/2020 Norton .................. G06N 3/045
2023/0061761 A1* 3/2023 Rothschild ............. G10L 25/57

OTHER PUBLICATIONS

Using Avatars in meetings and webinars, Zoom Support, Dec. 16, 2022, 3 pages.

* cited by examiner

GENERATING A USER AVATAR FOR VIDEO COMMUNICATIONS

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example computing system is described. The computing system is configured for performing a set of acts including (i) receiving audio from a first client device engaged in a communication session with a second client device, the audio comprising one or more words spoken by a user of the first client device; (ii) using the audio and a facial feature model to estimate facial movement that corresponds to the one or more words spoken by the user; (iii) generating a synthetic video depicting an avatar of the user moving according to the estimated facial movement; and (iv) in response to generating the synthetic video, causing the second client device to present the synthetic video synchronized with the audio.

In another aspect, an example method is described. The method includes (i) receiving audio from a first client device engaged in a communication session with a second client device, the audio comprising one or more words spoken by a user of the first client device; (ii) using the audio and a facial feature model to estimate facial movement that corresponds to the one or more words spoken by the user; (iii) generating a synthetic video depicting an avatar of the user moving according to the estimated facial movement; and (iv) in response to generating the synthetic video, causing the second client device to present the synthetic video synchronized with the audio.

In another aspect, a non-transitory computer-readable medium is described. The non-transitory computer-readable medium has stored thereon program instructions that upon execution by a computing system, cause performance of a set of acts. The set of acts include (i) receiving audio from a first client device engaged in a communication session with a second client device, the audio comprising one or more words spoken by a user of the first client device; (ii) using the audio and a facial feature model to estimate facial movement that corresponds to the one or more words spoken by the user; (iii) generating a synthetic video depicting an avatar of the user moving according to the estimated facial movement; and (iv) in response to generating the synthetic video, causing the second client device to present the synthetic video synchronized with the audio.

DETAILED DESCRIPTION

I. Overview

Figure 1:
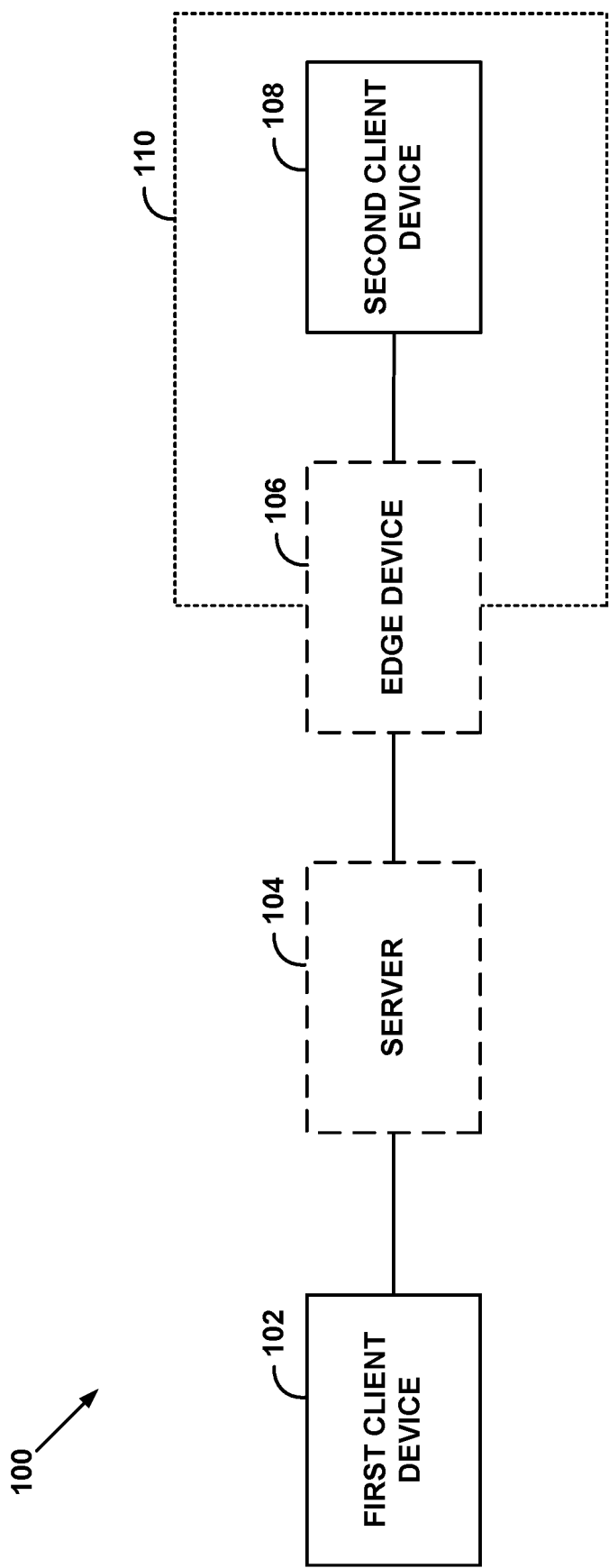
FIG. 1 is a simplified block diagram of an example communication system in which various described principles can be implemented.

The disclosed systems and corresponding methods address scenarios that can arise in video communication sessions between client devices, such as during cloud-based video conferencing, particularly scenarios in which users are fatigued from being on camera or otherwise do not desire to be on camera. In situations where face-to-face video calls are desired, such as for a team of employees remotely collaborating to achieve a goal, it can be undesirable for one or more of the participants in the call to not be on video when they are speaking. Typically, when a user that is speaking decides to go off camera, their video feed is replaced with a static image from the perspective of the other users listening, but this can sometimes negatively impact the user experience of the listeners.

Accordingly, in an example method, a computing system receives audio from a first client device engaged in a communication session with a second client device, the audio comprising one or more words spoken by a user of the first client device. The computing system uses the audio and a facial feature model to estimate facial movement that corresponds to the one or more words spoken by the user. The computing system then generates a synthetic video depicting an avatar of the user moving according to the estimated facial movement and, in response to generating the synthetic video, causes the second client device to present the synthetic video synchronized with the audio.

The example method can be performed by the receiving device (i.e., the second client device in a scenario where the user of the first client device is speaking) or by an edge device connected to a local network of the receiving device. This can reduce or eliminate a computational burden on other computing devices that might be involved in facilitating the video communication session, such as a server. In other situations, however, the server or the first client device could perform the example method.

The avatar can be a photorealistic avatar of the user of the first client device and the facial feature model can be trained using pre-recorded videos of that user as training data. The avatar is driven by the audio, and thus the first client device does not need to send the video feed of the user to the second client device, which can be desirable in scenarios in which the first and/or second client device has low bandwidth and/or less-than-desired computational resources to dedicate to transmitting or receiving the video feed, for instance. Alternatively, the computing system can use facial landmark tracking in the live video feed of the user of the first client device to drive the facial position of an existing avatar.

The disclosed systems and methods advantageously allow the speaker to reduce video-communication fatigue while also allowing the listener(s) to benefit from a face-to-face video call in which the listener(s) view a visual representation of how the speaker would look while speaking.

Various other features of these systems and methods are described hereinafter with reference to the accompanying figures.

II. Example Architecture

A. Example Communication System

FIG. 1 is a simplified block diagram of an example communication system 100. The communication system 100 can include various components, including a first client device 102, a server 104, an edge device 106, and a second client device 108. The communication system 100 can be configured to facilitate a communication session between the first client device 102 and the second client device 108, and can be further configured to generate a synthetic video that replaces a user of the first client device 102 with an avatar of the user.

The first client device 102 and/or the second client device 108 can be or include a mobile phone, laptop computer, desktop computer, tablet computer, video game console, set-top box, television set, television set with integrated set-top box, or other type of computing device.

The edge device 106 can be or include an access point, Internet of Things (IoT) gateway, other type of gateway, or other type of computing device. The edge device 106 can be configured to act as a bridge between a local network 110 that includes the edge device 106 and the second client device 108 and another external network (or networks), such as a cloud network. As such, the edge device 106 can be configured to process, monitor, filter, and/or otherwise manage traffic to and from the local network 110 and the second client device 108.

The communication system 100 can also include one or more connection mechanisms that connect various components within the communication system 100. For example, the communication system 100 can include the connection mechanisms represented by lines connecting components of the communication system 100, as shown in FIG. 1.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

The communication system 100 and/or components thereof can take the form of a computing system, an example of which is described below.

In some cases, the communication system 100 can include multiple instances of at least some of the described components, such as multiple instances of the server 104.

In the context of a video communication session (e.g., a video conference or meeting) between the first client device 102 and the second client device 108, for example, various implementations of the communication system 100 are possible, including those in which the edge device 106 and/or the server 104 might not be present or might not be participating in facilitating the communication session.

In some implementations, the first client device 102 and the second client device 108 can be in direct communication over a peer-to-peer (P2P) connection, such that network traffic such as a video feed does not go through any server, but rather goes directly between the client devices.

In other implementations, the server 104 (e.g., a cloud-based server) can be present and used to facilitate the communication session between the first client device 102 and the second client device 108, particularly where the client devices connect to the server 104 to join the communication session and, after that, the video feed from one client device is received by the server 104 and then forwarded by the server 104 to the other client device.

In yet other implementations, a hybrid approach can be used in which the server 104 hosts a cloud platform that initiates a handshake between the first client device 102 and the second client device 108, notifies each client device that a communication session has been established, and then takes no action relative to the video feeds to and from each client device. That is, once the two client devices are in the communication session, the video feed from one client device is transmitted directly to the other client device and does not go through the server 104.

In any one or more of the above-described implementations, the edge device 106 can be present in the local network 110 of the second client device 108 and the video feed to and from the second client device 108 can go through the edge device 106.

Although not explicitly shown in FIG. 1, there can be implementations in which the first client device 102 is part of its own local network that includes an edge device that operates in the same or similar way to edge device 106 as described herein.

B. Example Computing System

Figure 2:
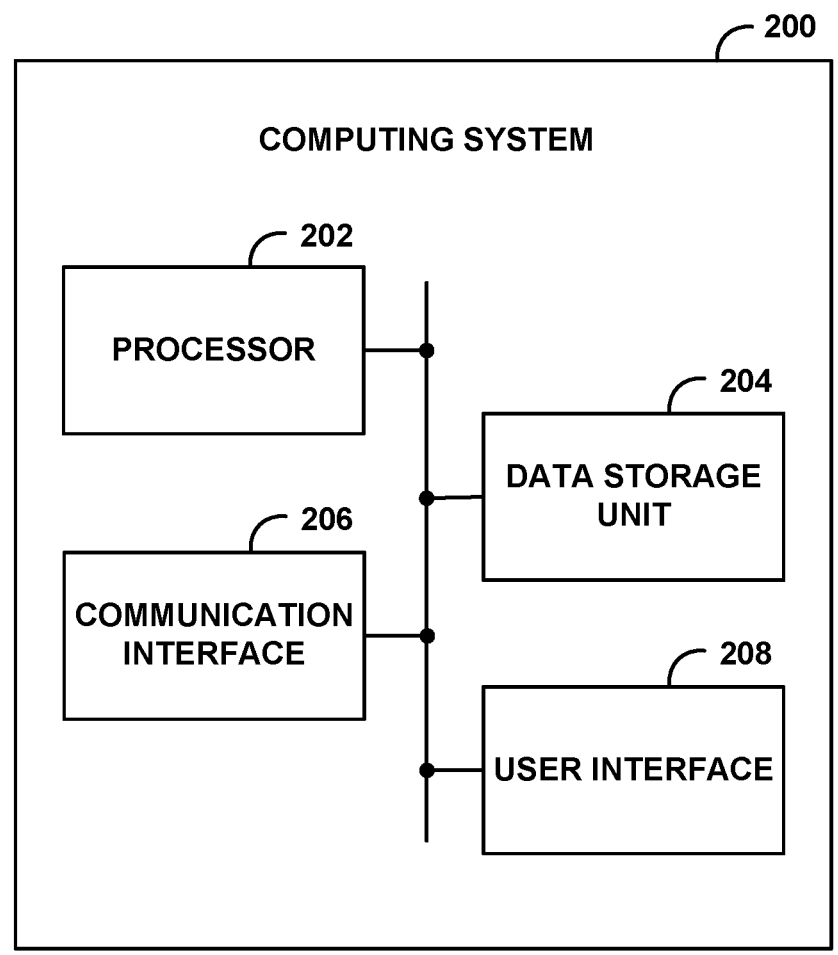
FIG. 2 is a simplified block diagram of an example computing system in which various described principles can be implemented.

FIG. 2 is a simplified block diagram of an example computing system 200. The computing system 200 can be configured to perform and/or can perform one or more operations, such as the operations described in this disclosure. The computing system 200 can include various components, such as a processor 202, a data-storage unit 204, a communication interface 206, and/or a user interface 208.

The processor 202 can be or include a general-purpose processor (e.g., a microprocessor) and/or a special-purpose processor (e.g., a digital signal processor). The processor 202 can execute program instructions included in the data-storage unit 204 as described below.

The data-storage unit 204 can be or include one or more volatile, non-volatile, removable, and/or non-removable storage components, such as magnetic, optical, and/or flash storage, and/or can be integrated in whole or in part with the processor 202. Further, the data-storage unit 204 can be or include a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data-storage unit 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface or a High-Definition Multimedia Interface (HDMI). In another example, the communication interface 206 can be or include a wireless interface, such as a cellular or WI-FI interface.

The user interface 208 can allow for interaction between the computing system 200 and a user of the computing system 200. As such, the user interface 208 can be or include an input component such as a keyboard, a mouse, a remote controller, a microphone, and/or a touch-sensitive panel. The user interface 208 can also be or include an output component such as a display device (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200, as shown in FIG. 2.

The computing system 200 can include one or more of the above-described components and can be configured or arranged in various ways. For example, the computing system 200 can be configured as a server and/or a client (or perhaps a cluster of servers and/or a cluster of clients) operating in one or more server-client type arrangements, for instance.

As noted above, the communication system 100 or components of the communication system 100 can take the form of a computing system, such as the computing system 200. In some cases, some or all these entities can take the form of a more specific type of computing system, such as a desktop computer, a laptop computer, a tablet computer, a mobile phone (e.g., smartphone), among other possibilities.

III. Example Operations

The computing system 200 can be configured to perform one or more operations. Examples of these operations and related features will now be described with reference to FIGS. 3-5.

In line with the discussion above, the computing system 200 that performs at least some of the operations described below can be the server 104, a controller of the second client device 108, a controller of the edge device 106, a controller of the first client device 102, or a controller of an edge device of a respective local network of the first client device 102.

Furthermore, the example operations described below are described primarily in the context of the second client device 108 presenting a synthetic video of an avatar of a user of the first client device 102 (also referred to hereinafter as the "first user"). It should be understood that the operations can also be performed (e.g., by the server 104, the first client device 102, or an edge device of a local network of the first client device 102) in the context of the first client device 102 presenting a synthetic video of an avatar of a user of the second client device 108 (also referred to hereinafter as the "second user").

The computing system 200 can receive audio from the first client device 102 that is engaged in a communication session with the second client device 108. The audio can include one or more words, or portions thereof (e.g., a phenome), spoken by the first user.

Having received the audio, the computing system 200 can use the audio and a facial feature model to estimate facial movement that corresponds to the one or more words spoken by the user. The facial feature model can be stored in local memory of the computing system 200 (e.g., data-storage unit 204) or in a remote database.

By way of example, the facial feature model can be configured to input a portion of the user's audio (e.g., a waveform) and output estimated facial movements that are estimated to represent how the user is likely to appear while uttering the spoken word(s), or portions thereof (e.g., phenome(s)), present in that portion of audio. The estimated facial movement can include one or more individual facial movements, each output in the form of a video clip that includes a photorealistic avatar of the user performing the respective facial movement. In some cases, the video clip can include the portion of audio, although in other cases the video clip might be video only. Each individual facial movement can include movement of one or more facial features such as lips, teeth, tongue, jaw, chin, cheek, forehead, eye, eyelid, nose, nostril, temple, and neck.

To accomplish this, for example, the facial feature model can include a classifier that is configured to map each of a plurality of words to a respective one of a plurality of facial movements. At some point, the computing system 200 can receive one or more pre-recorded videos of the user, and the classifier can be trained using one or more pre-recorded videos of the user as training data. In some cases, the facial feature model can be or include a deep learning-based model that uses convolutional neural networks (CNN), transformer models, and/or deep neural networks (DNNs) trained using the one or more pre-recorded videos. Each such neural network can convert audio into one or more frames of video of corresponding facial movements. The pre-recorded videos can be previous video communication sessions of the user captured by a camera of the first client device 102, or other types of videos of the user.

Having estimated the facial movement of the user speaking the one or more words, the computing system 200 can generate a synthetic video depicting an avatar of the user moving according to the estimated facial movement. For example, the computing system 200 can generate the synthetic video by assembling all of the video clips output by the classifier in temporal order. As a more specific example, given audio including the user speaking the words "good morning," the classifier might output a first video clip with the avatar emulating facial movements involved in speaking the word "good," followed by a second video clip with the avatar estimating facial movements involved in speaking the word "morning," and the computing system 200 can edit the two video clips together.

In response to generating the synthetic video, the computing system 200 can cause the second client device 108 to present the synthetic video synchronized with the audio. For example, the computing system 200 can transmit an instruction to the second client device that, upon receipt by the second client device 108, causes the second client device 108 to play out the synthetic video and the synchronized audio using a display device and speaker of the second client device 108. In cases where the computing system 200 is a controller of the second client device 108, causing the second client device 108 to present the synthetic video synchronized with the audio can involve causing the display device and speaker of the second client device 108 to play out to present the synthetic video synchronized with the audio.

In some cases, the act of generating the synthetic video can involve synchronizing the audio with the assembled video clips, and thus the generated synthetic video can include the audio temporally aligned with the synthetic video. In other cases, the generated synthetic video might not include the audio and the audio can be played out separately, synchronized with the playout of the synthetic video.

In some implementations, the acts of using the audio and the facial feature model to estimate the facial movement, generating the synthetic video, and causing the second client device to present the synthetic video synchronized with the audio, can be performed in response to the computing system 200 determining that a set of conditions are met. For example, the set of conditions can include a condition that the computing system 200 has a quantity of computational resources that exceeds a predefined computational resource threshold and/or a condition that the computing system 200 has a bandwidth that is lower than a predefined bandwidth threshold (where the predefined bandwidth threshold represents a minimum bandwidth for supporting video communication between the second client device 108 and the first client device 102).

In more specific examples, the set of conditions can include a condition that the second client device 108 has a quantity of computational resources that exceeds the predefined computational resource threshold, a condition that the second client device 108 has a bandwidth that is lower than the predefined bandwidth threshold, and/or a condition that the first client device 102 has a bandwidth that is lower than the predefined bandwidth threshold.

In implementations in which the edge device 106 is present in the local network 110 of the second client device 108, the set of conditions can additionally or alternatively include a condition that the edge device 106 has a quantity of computational resources that exceeds the predefined computational resource threshold and/or a condition that the edge device 106 has a bandwidth that is lower than the predefined bandwidth threshold.

As such, an avatar of the first user can be used instead of the normal video feed of the user in situations where the computing system 200 determines that the first client device 102 and/or the second client device 108 has less-than-desired bandwidth for normal video communication, or in situations where the computing system 200 determines that the second client device 108 has enough computational resources to desirably render the normal video feed of the first user.

Other conditions are possible as well. For example, the set of conditions can include a condition that the computing system 200 detects that the first client device 102 is not connected to a camera. To facilitate this, for instance, upon beginning the communication session, the first client device 102 can transmit a message to the computing system 200 indicating that the first client device 102 is not connected to a camera.

As another example, the set of conditions can include a condition that the computing system 200 receives a particular type of user input from the second user (or the first user), and the computing system 200 can interpret receipt of the particular type of user input as an instruction to not display (or stop displaying) the normal video feed of the first user and instead display an avatar of the first user.

The user input can be, for instance, the first user requesting that at least one of the other users involved in the video communication session be presented with the avatar of the first user instead of the normal video feed from that user. Alternatively, the user input can be the second user disabling an active speaker view by pinning the normal video feed of the first user to the second user's screen, which would cause the normal video feed to switch to the avatar.

Figure 3:
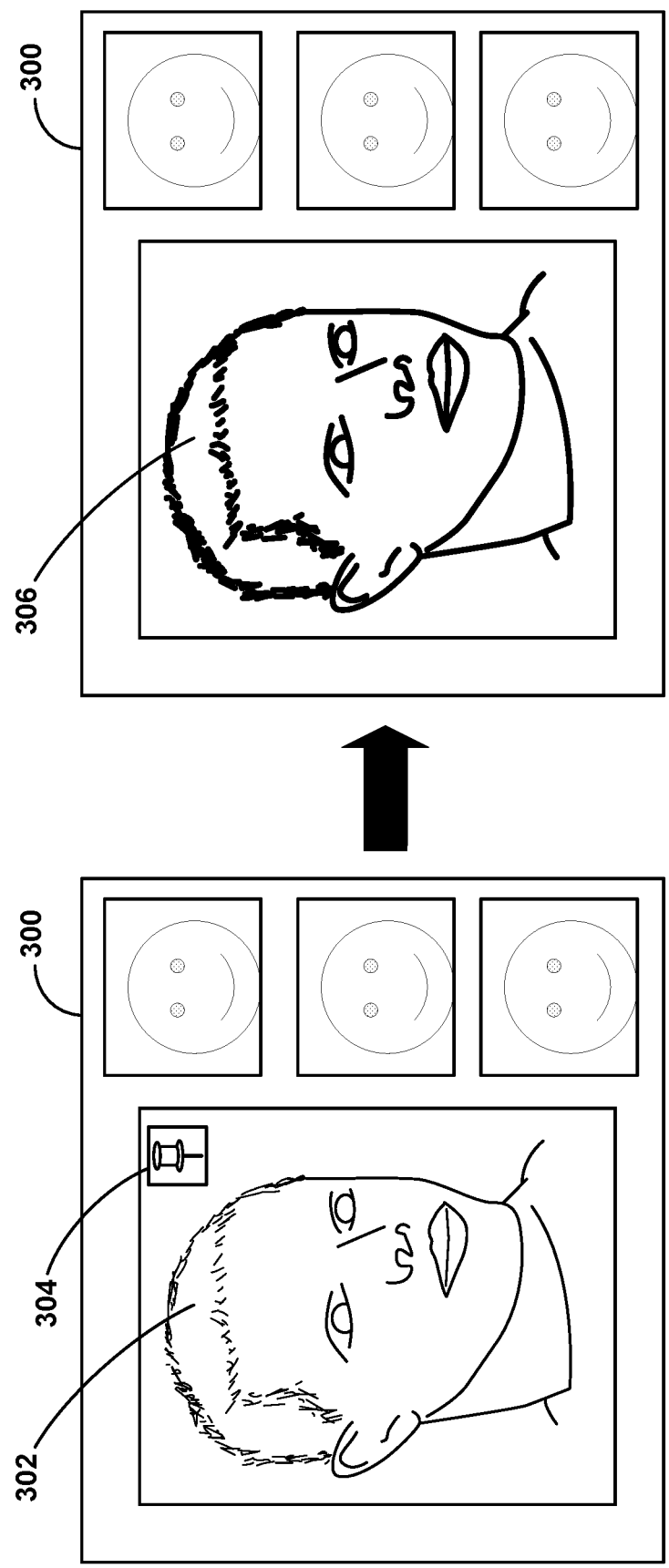
FIG. 3 is an example graphical user interface.

FIG. 3 is an example graphical user interface 300 of the second user depicting a scenario where the second user is viewing a video feed 302 of the first user while in a video conference with the first user and three other users, and then attempts to pin the video feed 302 to screen by selecting the pin graphic 304. This can cause the computing system 200 to perform the above-described operations, thus switching from the video feed 302 of the first user to the synthetic video 306 of the first user in real time.

In some implementations, the computing system 200 can selectively present the avatar of the first user relative to the first user's normal video feed, such as automatically every time the first user speaks during the video communication session. In other implementations, the computing system 200 can generate and display a static avatar of the first user when the first user is not speaking.

In some implementations, before or while performing some or all of the above-described operations, the computing system 200 can instruct the first client device 102 to stop transmitting the video feed of the first user.

In some implementations, instead of the computing system 200 generating a photorealistic avatar of the first user generated in the manner described above, the computing system 200 can use a live video feed of the first user to drive an animated-dynamic avatar of the first user. To facilitate this as a general matter, the computing system 200 can cause a camera coupled to the first client device 102 to capture the video feed of the first user, perform facial landmark tracking on the video feed to estimate facial movement of the first user, and use the estimated facial movement to drive a pre-generated avatar of the first user. In this way, the facial landmark tracking drives lip and other face movement of the avatar as opposed to the first user's audio.

As an example of this process, a facial detection model of the computing system 200 can obtain frames of the first user's video feed and estimate the position of the first user's face in different respective frames of the video, such as by using a machine learning model that uses image analysis to detect and identify the position of the first user's face in a frame using a set of facial landmarks, including lips, teeth, tongue, jaw, chin, cheek, forehead, eye, eyelid, nose, nostril, temple, and neck. The computing system 200 can then use estimated positions of the first user's face to generate synthetic frames in which the corresponding facial landmarks of an avatar of the first user have the same estimated positions.

In some implementations, the computing system 200 can be configured to provide an option to the second user to adjust the appearance of the avatar of the first user. In some cases, before or while the second client device is presenting the synthetic video, the computing system 200 can detect user input indicative of a command to adjust an appearance of the avatar of the first user. For example, before or while the second client device 108 is presenting the synthetic video, the computing system 200 can cause the second client device 108 to display a selectable option to adjust an appearance of the avatar of the first user and can receive user input from the second user in the form of the second user selecting the selectable option. In response to detecting the user input, the computing system 200 can generate a modified version of the synthetic video depicting the avatar of the user in accordance with the adjusted appearance and cause the second client device 108 to present the modified version of the synthetic video synchronized with the audio. Options for adjusting the appearance of the avatar can include, for example, adding, removing, or changing clothing (e.g., a jacket), accessories (e.g., jewelry or glasses), makeup (e.g., lipstick), and/or hair, among other possibilities.

In some cases, the above-described avatar adjustment functionality can be extended to selectively modify the appearance of the avatar to other participants in the communication session. For example, the second user can adjust the appearance first user's avatar in one way, and then modify (or choose to not modify) the appearance of the avatars of any other participants in another way.

In similar implementations to the above-described avatar adjustment functionality, the first client device 102 or the computing system 200 can be configured to provide an option to the first user to adjust how their avatar appears to the second user and/or to any other participants in the communication session.

In some implementations, the computing system 200 can be configured to perform one or more operations for verifying the identity of the first user to the second user and/or to other participants in the communication session, so as to certify that the avatar being depicted and the audio being synchronized with that avatar indeed belong to the first user.

As an example, the computing system 200 can receive at least one captured image of the first user, such as an image that is captured by a camera connected to the first client device 102 while the first user is in the communication session or at some other point in time. The computing system 200 can then perform facial recognition on the image, which can involve any one or more of a variety of facial recognition techniques, including feature analysis and neural networks. For instance, the facial recognition can involve comparing the image to at least one reference image of the first user, such as one or more images of the first user captured and stored before the communication session was initiated. In some cases, the facial recognition can compare a frame of the synthetic video to at least one reference image of the first user. An output of the facial recognition can indicate whether a match between the image and the reference image(s) is detected or can otherwise indicate a level of confidence as to whether the avatar indeed depicts the originator of the audio (i.e., the first user).

Additionally or alternatively to using images as a basis for verifying the identity of the first user, the computing system 200 can use audio as a basis for the verifying. Particularly, the computing system 200 can receive a pre-recorded audio sample of the first user, such as an audio clip from a different, previous communication session or other audio recording of the first user. The computing system 200 can then compare the pre-recorded audio sample to the audio received from the first client device 102, such as by using one or more audio recognition techniques (e.g., audio content recognition, such as audio fingerprint matching). An output of the audio recognition can indicate whether a match between the pre-recorded audio sample and at least a portion of the audio is detected or can otherwise indicate a level of confidence as to whether the audio indeed is the voice the first user.

Based on the output of the facial recognition and/or an output of the audio recognition, the computing system 200 can cause the second client device 108 to present (e.g., display on a graphical user interface) an indication verifying an identity of the first user or indicating that the identity of the first user is not confirmed. As an example, the indication can take the form of a logo or text that appears on the display of the second client device 108, that the second user can recognize as a certification that the avatar represents the first user and that the audio originated from the first user. Other examples are possible as well.

Figure 4:
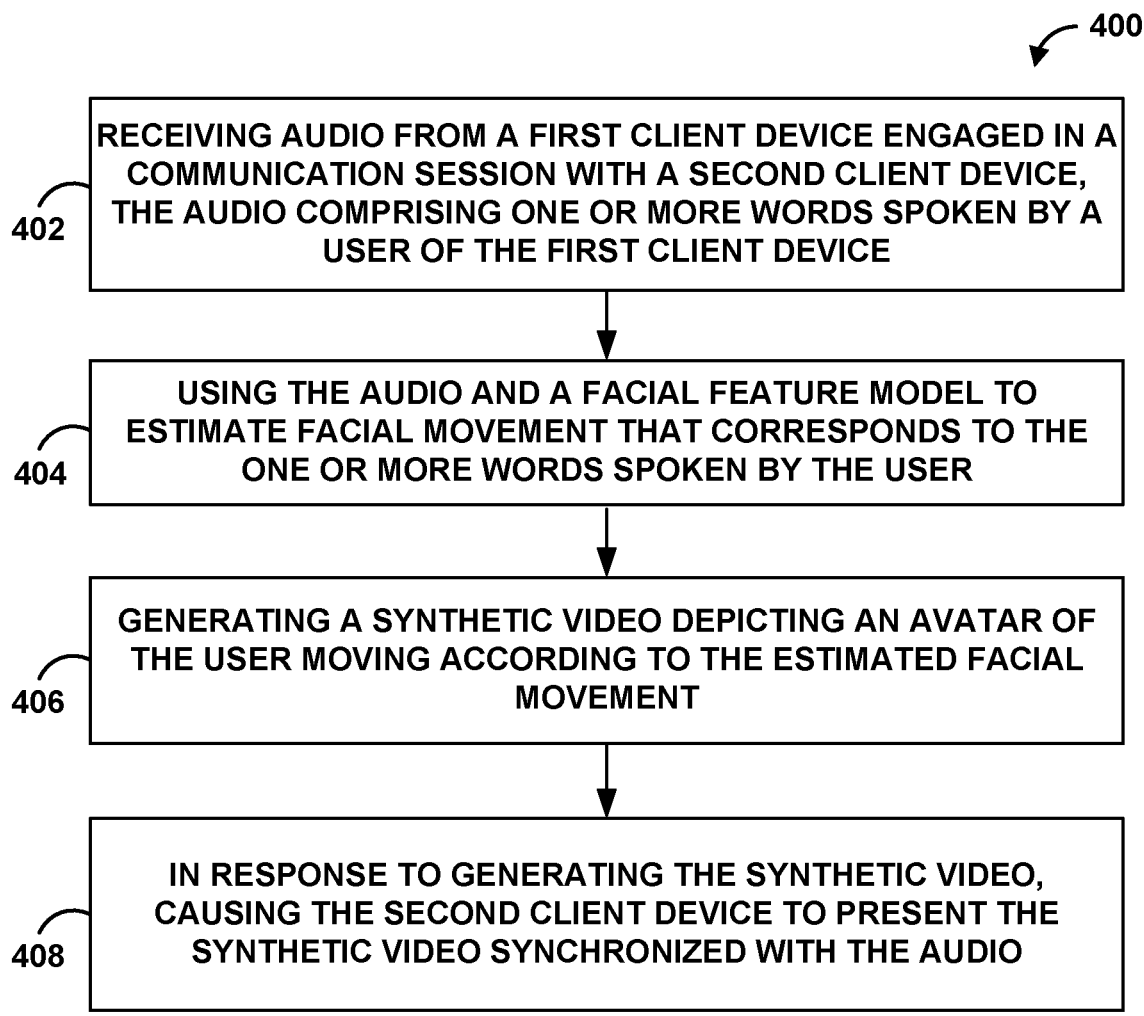
FIG. 4 is a flow chart of an example method.

FIG. 4 is a flow chart illustrating an example method 400. The method 400 can be carried out by a computing system such as computing system 200. At block 402, the method 400 includes receiving audio from a first client device engaged in a communication session with a second client device, the audio comprising one or more words spoken by a user of the first client device. At block 404, the method 400 includes using the audio and a facial feature model to estimate facial movement that corresponds to the one or more words spoken by the user. At block 406, the method 400 includes generating a synthetic video depicting an avatar of the user moving according to the estimated facial movement. At block 408, the method 400 includes in response to generating the synthetic video, causing the second client device to present the synthetic video synchronized with the audio.

Figure 5:
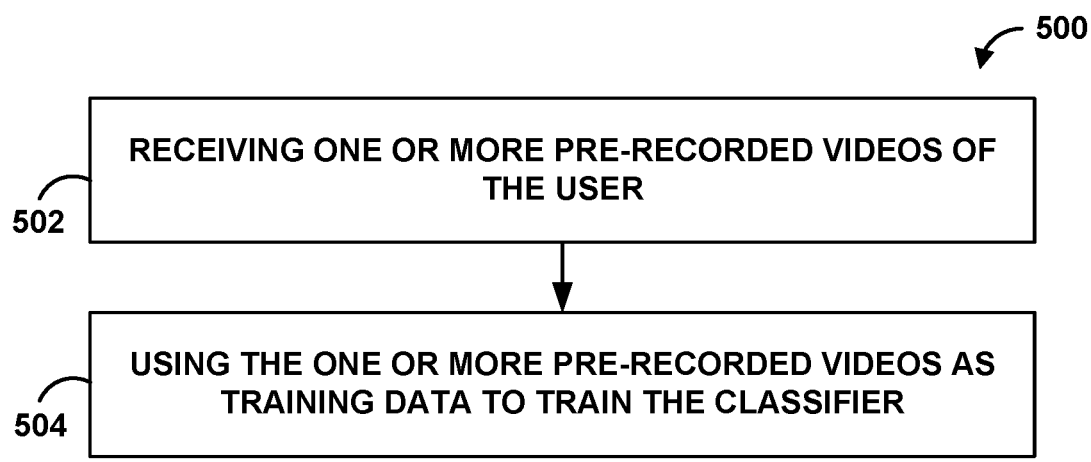
FIG. 5 is a flow chart of another example method.

FIG. 5 is a flow chart illustrating another example method 500. The method 500 can be carried out by a computing system such as computing system 200, particularly in a scenario where the facial feature model of method 400 includes a classifier configured to map each of a plurality of words to a respective one of a plurality of facial movements. At block 502, the method 500 includes receiving one or more pre-recorded videos of the user. At block 504, the method 700 includes using the one or more pre-recorded videos as training data to train the classifier.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

What is claimed is:

1. A computing system comprising a processor and a non-transitory computer-readable storage medium having stored thereon program instructions that upon execution by the processor cause the computing system to perform configured for performing a set of acts comprising:
receiving audio from a first client device engaged in a communication session with a second client device, the audio comprising one or more words spoken by a user of the first client device;
using the audio and a facial feature model to estimate facial movement that corresponds to the one or more words spoken by the user, wherein the facial feature model comprises a classifier configured to map each of a plurality of words to a respective one of a plurality of facial movements;
receiving one or more pre-recorded videos of the user;
using the one or more pre-recorded videos as training data to train the classifier;
generating a synthetic video depicting an avatar of the user moving according to the estimated facial movement; and
in response to generating the synthetic video, causing the second client device to present the synthetic video synchronized with the audio.

2. The computing system of claim 1, wherein the computing system is a controller of the second client device.

3. The computing system of claim 1, wherein:
the second client device is part of a local network comprising an edge device,
the edge device is configured to manage traffic between the second client device and the first client device, and
the computing system is a controller of the edge device.

4. The computing system of claim 1, wherein the computing system is a server configured to facilitate the communication session between the first client device and the second client device.

5. The computing system of claim 1, the set of acts further comprising:
determining that a set of conditions are met,
wherein:
the acts of using the audio and the facial feature model to estimate the facial movement, generating the synthetic video, and causing the second client device to present the synthetic video synchronized with the audio are performed in response to the determination that the set of conditions are met,
the set of conditions comprises one or more of:
a condition that the second client device has a quantity of computational resources that exceeds a predefined computational resource threshold,
a condition that the second client device has a bandwidth that is lower than a predefined bandwidth threshold, the predefined bandwidth threshold representing a minimum bandwidth for supporting video communication between the second client device and the first client device, or
a condition that the first client device has a bandwidth that is lower than the predefined bandwidth threshold.

6. A method performed by a computing system, the method comprising:
receiving audio from a first client device engaged in a communication session with a second client device, the audio comprising one or more words spoken by a user of the first client device;
using the audio and a facial feature model to estimate facial movement that corresponds to the one or more words spoken by the user, wherein the facial feature model comprises a classifier configured to map each of a plurality of words to a respective one of a plurality of facial movements;
receiving one or more pre-recorded videos of the user;
using the one or more pre-recorded videos as training data to train the classifier;
generating a synthetic video depicting an avatar of the user moving according to the estimated facial movement; and
in response to generating the synthetic video, causing the second client device to present the synthetic video synchronized with the audio.

7. The method of claim 6, wherein the computing system is a controller of the second client device.

8. The method of claim 6, wherein:
the second client device is part of a local network comprising an edge device,
the edge device is configured to manage traffic between the second client device and the first client device, and
the computing system is a controller of the edge device.

9. The method of claim 6, wherein the computing system is a server configured to facilitate the communication session between the first client device and the second client device.

10. The method of claim 6, further comprising:
determining that a set of conditions are met,
wherein:
using the audio and the facial feature model to estimate the facial movement, generating the synthetic video, and causing the second client device to present the synthetic video synchronized with the audio are performed in response to the determination that the set of conditions are met,
the set of conditions comprises one or more of:
a condition that the second client device has a quantity of computational resources that exceeds a predefined computational resource threshold,
a condition that the second client device has a bandwidth that is lower than a predefined bandwidth threshold, the predefined bandwidth threshold representing a minimum bandwidth for supporting video communication between the second client device and the first client device, or
a condition that the first client device has a bandwidth that is lower than the predefined bandwidth threshold.

11. The method of claim 6, further comprising:
before or while the second client device is presenting the synthetic video, detecting user input indicative of a command to adjust an appearance of the avatar of the user; and
in response to detecting the user input, (i) generating a modified version of the synthetic video depicting the avatar of the user in accordance with the adjusted appearance and (ii) causing the second client device to present the modified version of the synthetic video synchronized with the audio.

12. The method of claim 6, further comprising:
receiving at least one captured image of the user of the first client device;
receiving a pre-recorded audio sample of the user of the first client device;
performing facial recognition on the at least one captured image of the user, wherein the facial recognition comprises comparing the at least one captured image of the user to at least one reference image of the user;
comparing the pre-recorded audio sample to the audio received from the first client device; and
based on an output of the facial recognition and the comparing of the pre-recorded audio sample to the audio received from the first client device, causing the second client device to present an indication verifying an identity of the user.

13. A non-transitory computer-readable medium having stored thereon program instructions that upon execution by a computing system, cause performance of a set of acts comprising:
receiving audio from a first client device engaged in a communication session with a second client device, the audio comprising one or more words spoken by a user of the first client device;
using the audio and a facial feature model to estimate facial movement that corresponds to the one or more words spoken by the user, wherein the facial feature model comprises a classifier configured to map each of a plurality of words to a respective one of a plurality of facial movements;
receiving one or more pre-recorded videos of the user;
using the one or more pre-recorded videos as training data to train the classifier;

generating a synthetic video depicting an avatar of the user moving according to the estimated facial movement; and in response to generating the synthetic video, causing the second client device to present the synthetic video synchronized with the audio.

14. The non-transitory computer-readable medium of claim 13, wherein the computing system is a controller of the second client device.

* * * * *